United States Patent Office 3,705,917
Patented Dec. 12, 1972

3,705,917
PROCESS FOR PREPARING FLUOROPERHALO-ALKYL ISOCYANATES
Cyril Woolf, Morristown, Bryce C. Oxenrider, Florham Park, and Wilhelmus M. Beyleveld, Whippany, N.J., assignors to Allied Chemical Corporation, New York, N.Y.
No Drawing. Filed Feb. 26, 1970, Ser. No. 14,652
Int. Cl. C07c *119/04*
U.S. Cl. 260—453 P                             24 Claims

ABSTRACT OF THE DISCLOSURE

Fluoroperhaloalkyl isocyanates and fluoroperhaloazaolefins are prepared by reacting a fluoroperhalogenated carbonyl compound with a cyanogen halide and an ionizable fluoride salt in the presence of an aprotic, polar liquid reaction medium. For example, $(CF_3)_2CFNO$ and $$(CF_3)_2CFN=C(CF_3)_2$$

are prepared by reacting hexafluoroacetone with cyanogen chloride and potassium fluoride in the presence of acetonitrile. A separate mixture of the isocyanate and the azaolefin is normally obtained, but the reaction conditions can be controlled to favor formation of either product.

---

This invention relates to a process for preparing fluoroperhaloalkyl isocyanates and fluoroperhaloazaolefins.

Fluoroperhaloalkyl isocyanates are a known class of useful compounds having an interesting combination of chemical and physical properties. They can be converted in accordance with known methods into fluorinated compounds containing functional groups derived from the isocyanate group. Perfluoroalkyl isocyanates in particular are useful as water-repellent finishes and as intermediates in the preparation of compounds bearing perfluoroalkyl chains.

Perfluoroalkyl isocyanates and a method for their preparation are disclosed in U.S. Pat. 2,617,817. The method employed in the patent is that of reacting sodium azide with a perfluoroalkyl acid chloride, followed by thermal decomposition of the resultant perfluoroacyl azide into nitrogen and the isocyanate. However, as indicated in the patent, the perfluoroacyl azide is dangerously explosive, which renders this method of producing perfluoroalkyl isocyanates generally unsatisfactory.

Another method for preparing fluoroalkyl isocyanates is described in U.S. Pat. 3,118,923. The patent discloses that fluoroalkyl nitriles react with carbonyl difluoride to form the desired fluoroalkyl isocyanate. However, for satisfactory results, this reaction appears to require rather stringent reaction conditions, including temperatures in excess of 200° C. and long reaction times; and even under these conditions, the yield is poor. Also, the fluoroalkyl nitrile starting materials are not available commercially and accordingly must in turn be synthesized. Hence, this method of preparing fluoroalkyl isocyanates is generally unattractive.

Perfluoroazaolefins are also a known class of compounds useful as intermediates in preparing fluorinated compounds containing functional groups. U.S. Pat. 2,643,267 discloses a method for preparing perfluoroazaolefins by the pyrolytic decomposition of perfluoroalkyl tertiary-amines; however, this method requires extreme temperatures and the yield of perfluoroazaolefin is low.

It is an object of this invention to provide an improved method for preparing fluoroalkyl isocyanates and fluoroperhaloazaolefins.

SUMMARY OF THE INVENTION

In accordance with this invention, compounds selected from the group consisting of (a) fluoroperhaloalkyl isocyanates having the formula

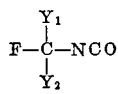

wherein $Y_1$ and $Y_2$ are independently fluorine or fluoroperhaloalkyl radicals having either the formula $$CF_2X(CFX)_m—$$

wherein X is fluorine, chlorine or bromine and m is 0 to 6, or the formula

wherein X is fluorine, chlorine or bromine and n is 3 to 5, and (b) fluoroperhaloazaolefins having the formula

wherein $Y_1$ and $Y_2$ are as defined above, and (c) mixtures thereof, are prepared by reacting, under substantially anhydrous conditions at a temperature below 200° C., a carbonyl compound having the formula

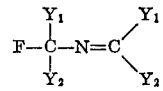

wherein $Z_1$ is $Y_1$ as defined above or chlorine, bromine or iodine, and $Z_2$ is $Y_2$ as defined above or chlorine, bromine or iodine, with a cyanogen halide and an ionizable fluoride salt capable of forming an alcoholate salt with the carbonyl compound, in the presence of an aprotic, polar, liquid reaction medium. A separable mixture of the fluoroperhaloalkyl isocyanate and the fluoroperhaloazaolefin is normally obtained; however, the reaction conditions can be controlled to favor formation of either reaction product. The products can readily be separated from each other and from the reaction mixture by fractional distillation.

Employing the same general method, diisocyanates having the formula

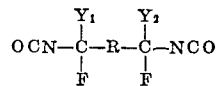

wherein $Y_1$ and $Y_2$ are as defined herein and R is a covalent bond or a perfluoroalkyl diradical of 1 to 12 carbon atoms or a perfluorocycloalkyl diradical of 4 to 6 carbon atoms, can be prepared from dicarbonyl compounds having the formula

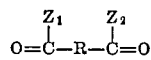

wherein $Z_1$ and $Z_2$ are as defined herein, and R has the meaning given above. Preferably R is a perfluoroalkyl diradical of 1 to 6 carbon atoms and $Z_1$ and $Z_2$ are independently fluorine, chlorine, or a fluoroperhaloalkyl radical having the formula $CF_2X(CFX)_m—$ wherein X is fluorine or chlorine, preferably fluorine, and m is 0 to 3.

In the preferred embodiments of this invention, the carbonyl reactant has the formula

wherein $Z_1$ and $Z_2$ are independently chlorine, fluorine or a fluoroperhaloalkyl radical having the formula $CF_2X(CFX)_m$— wherein X is fluorine or chlorine, preferably fluorine, and m is 0 to 3. In especially preferred embodiments, $Z_1$ and $Z_2$ are independently chlorine, fluorine, trifluoromethyl, chloro- difluoromethyl, or pentafluoroethyl.

Cyanogen chloride and cyanogen bromide are the preferred cyanogen halides employed in the process of this invention.

Suitable aprotic, polar, liquid reaction media include acetonitrile, dimethylformamide, dimethyl sulfoxide dimethyl acetamide, glycol ethers, and cyclic polymethylene sulfones. Acetonitrile is preferred.

Ionizable fluoride salts which are capable of forming an alcoholate salt with the carbonyl compound include potassium fluoride, rubidium fluoride, cesium fluoride, silver fluoride and tetra(lower alkyl) ammonium fluoride. Potassium fluoride, rubidium fluoride and cesium fluoride give especially good results. Lithium fluoride and sodium fluoride are not capable of forming an alcoholate salt with the carbonyl compound. The formation of the alcoholate salt is illustrated by the following equation:

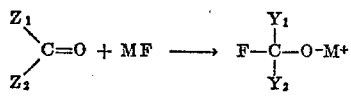

wherein M represents the cation portion of the fluoride and alcoholate salts. If $Z_1$ and/or $Z_2$ are chlorine, bromine, or iodine, an excess of the fluoride salt is employed to replace the halogen with fluorine, as illustrated in Examples 3, 6, and 7.

The alkoxide ion is believed to be an intermediate in the process of this invention and it is thought to play a role in influencing the relative formation of the two reaction products. Generally, preformation of the alkoxide ion tends to favor formation of the azaolefin. Preformation of the alkoxide ion is normally accomplished by allowing the carbonyl compound to react with the ionizable fluoride salt to form the corresponding alcoholate salt (alkoxide ion) before adding the cyanogen halide thereto. However, an important factor affecting preformation of the alkoxide ion is the ability of the particular carbonyl compound to readily form a stable alkoxide ion. (As used herein, the term "stable" is a relative term referring to the ability of the alkoxide ion to exist in solution without reconverting to the carbonyl compound.) Of the carbonyl compounds which can be used in the process of this invention, those wherein the total number of nonfluorine halogen atoms on all carbon atoms immediately adjacent to the carbonyl carbon atom is 1 or 0, preferably 0, tend to readily form stable alkoxide ions. Especially good results are obtained when the carbonyl reactant is perfluorinated. Also, carbonyl reactants which are ketones tend to form stable alkoxide ions more readily than acyl halides. Hexafluoroacetone, in particular, readily forms a stable heptafluoroisopropoxide ion.

Formation of the alkoxide ion is enhanced by employing an excess of both the carbonyl compound and the ionizable fluoride salt. Accordingly, formation of the azaolefin is favored by adding less than one mol of cyanogen halide to the reaction mixture for each mol of carbonyl compound and fluoride salt employed.

Formation of the isocyanate, on the other hand, is favored by forming the alkoxide ion in situ in the presence of the cyanogen halide. As a result, the alkoxide ion has the opportunity to react as soon as it is formed to produce the isocyanate, and is thereby consumed and not allowed to accumulate. To favor formation of the isocyanate, the carbonyl reactant is added to the other reactants gradually, preferably at about the same rate as that at which the isocyanate product is formed.

Formation of the isocyanate is illustrated by the following overall equation:

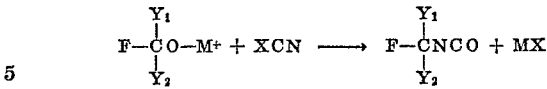

wherein $Y_1$, $Y_2$ and M are as defined herein and X is fluorine chlorine, bromine or iodine. The rate at which the isocyanate is formed can readily be determined by distilling the isocyanate from the reaction mixture during the course of the reaction and measuring the amount of isocyanate collected as a function of time. Removal of the isocyanate product from the reaction zone during the course of the reaction also favors formation of the isocyanate.

The alkoxide ion is unstable at temperatures above 200° C., so the process of the invention must be carried out at temperatures below 200° C. The process is conveniently carried out at room temperature, but temperatures below room temperature can be used if desired. At about —40° C., however, the reaction rate becomes impractically slow. The preferred temperature range is from about —20° C. to about 100° C.

The process of this invention is also conveniently carried out at atmospheric pressure. The pressure of the system, per se, is not especially critical, but in certain instances it may be desirable to carry out the process at pressures above or below atmospheric. For example, in order to facilitate removal of the isocyanate product from the reaction zone as it is formed, thus favoring formation of the isocyanate, it may be desirable to carry out the reaction under reduced pressure. On the other hand, if a volatile reactant, such as trifluoroacetyl chloride, is used and formation of the azaolefin is desired, it may be desirable to carry out the reaction at superatmospheric pressure in order to increase the effective concentration of the carbonyl compound in the reaction mixture.

A particularly advantageous feature of the process of this invention is that it permits the preparation of either one or both of two valuable products in essentially one step by combining the three initial reactants in a single reaction vessel. However, if desired, the process of this invention can be performed in two steps by reacting the carbonyl compound with the fluoride salt to form the alcoholate salt, and then reacting the preformed alcoholate salt with the cyanogen halide. However, as previously indicated, the two-step method tends to favor formation of the azaolefin.

The overall reaction for the formation of the azaolefin is represented by the following equation:

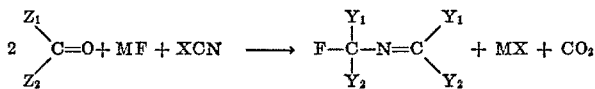

wherein M, X, $Y_1$, $Y_2$, $Z_1$ and $Z_2$ are as defined herein. The exact reaction mechanism leading to the azaolefin is not fully understood, and so the transitory intermediates leading to the formation of the azaolefin are not shown in the equation. We have discovered that the isocyanates prepared in accordance with the process of this invention react with alkoxide ions to form similar azaolefins, and the process based on this reaction is the subject of our, copending application Ser. No. 161,336, filed July 9, 1971; however, in the process of this invention, which is based on the reaction represented by the equation above, the azaolefin is not formed by the reaction of the alkoxide ion with isocyanate, although a minor amount of azaolefin might be formed concurrently by the latter reaction.

This invention is further illustrated by the following examples. In each of the examples the reaction was carried out under substantially anhydrous conditions and the products were identified by infrared spectrum analysis, nuclear magnetic resonance spectroscopy, mass spectrum and elemental analyses. In those examples wherein only the isocyanate or the azaolefin is mentioned, the presence of the other product is confirmed by spectral analysis.

EXAMPLE 1

The adduct (alcoholate salt) of hexafluoroacetone and potassium fluoride was prepared by combining 16.6 grams of hexafluoroacetone with 5.8 grams of potassium fluoride in 50 ml. of acetonitrile. The adduct was introduced over a period of 30 minutes into a flask containing 7.8 ml. of dimethylformamide, 100 ml. of acetonitrile and 6.0 grams of cyanogen chloride. The flask was fitted with a Dry Ice head, which in turn was connected to a Dry Ice trap, and a gas inlet tube through which a slow stream of nitrogen was continuously passed over the reaction mixture. The first drop of adduct caused the reaction mixture to become cloudy and within two hours there was a heavy precipitation of salt. The reaction mixture was allowed to stand overnight at room temperature with the stream of nitrogen being passed over it. The next morning a small amount of liquid was observed in the Dry Ice trap. The liquid remaining in the reaction mixture was distilled out of the flask by being gradually heated to about 85° C. The product which had collected in the Dry Ice trap was separated into two fractions: material volatile at room temperature (2.4 grams) and material not volatile at room temperature (15.1 grams). The material volatile at room temperature was predominantly perfluoroisopropyl isocyanate and the material not volatile at room temperature consisted essentially of 2,4 - di(trifluoromethyl)-3-azaperfluoropent-2-ene. The salt remaining in the flask was washed with acetonitrile, dried, and found to weigh 7.4 grams.

EXAMPLE 2

A 3-necked flask fitted with a stirrer, gas inlet tube, and water-cooled distillation head, was charged with 55 grams of potassium fluoride, 95 grams of cyanogen bromide, and 100 ml. of acetonitrile. Hexafluoroacetone was then introduced into the reaction mixture for two hours at a temperature of about 55° C. and at a rate of about 18 grams per hour. The reaction mixture was allowed to stand overnight at room temperature. The next day hexafluoroacetone was again introduced into the reaction mixture for 7 hours at about the same rate and at a temperature ranging from about 50° C. to about 65° C. The reaction mixture was again allowed to stand at room temperature overnight. On the third day introduction of hexafluoroacetone into the reaction mixture was resumed and continued for 6 hours at a temperature within the same range and at a rate of about 8.3 grams per hour. A total of 213 grams of hexafluoroacetone were introduced into the reaction mixture and a total of 200 grams of distillate were recovered. The distillate was redistilled. The first 62.4 grams of distillate recovered upon redistillation consisted essentially of unreacted hexafluoroacetone. The next 49.9 grams of distillate recovered consisted, on a weight basis, of 86% perfluoroisopropyl isocyanate, 8% 2,4-di(trifluoromethyl)-3-azaperfluoropent-2-ene, and 4% unreacted hexafluoroacetone. Further product was recovered upon further distillation, with the total amount of perfluoroisopropyl isocyanate recovered being 60 grams. The amount of salt recovered from the flask was 85.8 grams.

EXAMPLE 3

A 250 ml. flask fitted with a water-cooled distillation head connected to a Dry Ice trap was charged with 17.4 grams of potassium fluoride, 11.7 grams of cyanogen bromide and 100 ml. of acetonitrile. The reaction mixture was heated to 45–50° C. and 10 grams of phosgene were added over a period of about 75 minutes. The liquid which had collected in the Dry Ice trap was allowed to warm to room temperature and the vapor which evolved was analyzed and found to consist of carbonyl fluoride and trifluoromethyl isocyanate.

EXAMPLE 4

A flask fitted with a water-cooled distillation head connected to a Dry Ice trap was charged with 11.6 grams of potassium fluoride, 20 grams of cyanogen bromide and 50 ml. of acetonitrile. The reaction mixture was maintained at 50° C., stirred and kept under a nitrogen atmosphere as hexafluoroacetone was introduced into the flask at a rate of about 16.6 grams per hour. After one hour 14.6 grams of liquid were recovered from the trap; after two hours, 18.8 grams; after three hours, 16.3 grams; and after four hours, 20 grams. The liquid collected during the first three hours was predominantly perfluoroisopropyl isocyanate and the liquid collected during the fourth hour was predominantly hexafluoroacetone. All liquid collected was combined and distilled by being progressively heated up to a temperature of 20° C. to produce 25 grams of perfluoroisopropyl isocyanate. Four grams of residue remained after the distillation and upon analysis it was found that the residue contained 2,4-di(trifluoromethyl)-3-azaperfluoropent-2-ene.

EXAMPLE 5

A 3-necked flask equipped with a stirrer, thermometer, gas inlet, and Dry Ice head was flushed with nitrogen and charged with 29 grams of potassium fluoride and 100 ml. of acetonitrile. As this suspension was stirred at 25° C. to 40° C., a total of 95 grams of monochloropentafluoroacetone was added over a period of 2 hours. Next there was added a solution of 50 grams of cyanogen bromide in 50 ml. of acetonitrile. The mixture was stirred at 25° C. overnight and the next day was stirred at 50° C. The temperature was raised to 80° C. and the products were distilled out of the flask. Upon redistillation of the crude product mixture, there was obtained a liquid fraction having a boiling point range of 40–50° C. and which consisted essentially of monochlorohexafluoroisopropyl isocyanate.

EXAMPLE 6

A 6 ounce aerosol bottle was charged with 31 grams of cesium fluoride and 50 ml. of acetonitrile. The bottle was then sealed, cooled to −78° C., evacuated and then charged with 19 grams of pentafluoropropionyl chloride. The reaction mixture was warmed to 25° C. and stirred for one hour at which time the pressure inside the bottle was 25 p.s.i.g. The bottle was again cooled to −78° C. and charged with 7.5 grams of cyanogen chloride. The reaction mixture was then warmed to 25° C. and stirred overnight at 25° C. and then stirred at 100° C. for 16 hours. The products of the reaction were vented into a Dry Ice trap to give approximately 15 grams of liquid comprising pentafluoropropionyl fluoride, heptafluoropropyl isocyanate, and perfluoro-4-azahept-3-ene.

EXAMPLE 7

A 6 ounce aerosol bottle was charged with 12 grams of potassium fluoride and 25 ml. of acetonitrile. The bottle was then sealed, cooled to −78° C., evacuated, and then charged with 14 grams of trifluoroacetyl chloride. The reaction mixture was warmed to 25° C. and stirred for one hour at which time the pressure inside had leveled off at 70 p.s.i.g. The bottle was again cooled to −78° C. and charged with 7.5 grams of cyanogen chloride. The mixture was warmed to 25° C. and stirred at 25° C. for two days. During this period the pressure dropped intially to 25 p.s.i.g. and then rose gradually to 75 p.s.i.g. The gaseous mixture contained in the bottle was vented into a gas chromatograph and found to comprise pentafluoroethyl isocyanate, trifluoroacetyl fluoride, and perfluoro-3-azapent-2-ene.

EXAMPLE 8

To a flask containing a solution of 70 grams of cyanogen bromide in 50 ml. of acetonitrile there was added 320 ml. of a solution of 145 grams of the adduct of hexafluoroacetone and potassium fluoride in acetonitrile. After the reaction mixture had been allowed to react at 25° C. for 24 hours, 65 ml. of liquid was observed in a Dry Ice trap connected to the flask. The reaction mixture was allowed to stand for three days at 20° C. and was then heated to 50° C. The liquid remaining in the flask was distilled out of the flask by being gradually heated up to 80° C. The distillate was added to the liquid recovered from the Dry Ice trap and was redistilled to produce 87 grams of 2,4-di(trifluoromethyl)-3-azaperfluoropent-2-ene.

We claim:
1. A process for preparing a fluoroperhaloalkyl isocyanate having the formula

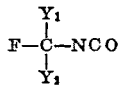

wherein $Y_1$ and $Y_2$ are independently fluorine or fluoroperhaloalkyl radicals having either the formula $$CF_2X(CFX)_m—$$

wherein X is fluorine, chlorine or bromine and $m$ is 0 to 6, or the formula

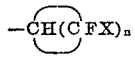

wherein X is fluorine, chlorine or bromine and $n$ is 3 to 5, which process comprises reacting, under substantially anhydrous conditions at a temperature below 200° C., a carbonyl compound having the formula

wherein $Z_1$ is $Y_1$ as defined above or chlorine, bromine or iodine, and $Z_2$ is $Y_2$ as defined above or chlorine, bromine or iodine, with a cyanogen halide and an ionizable fluoride salt capable of forming an alcoholate salt with the carbonyl compound, in the presence of an aprotic, polar, liquid reaction medium, the fluoride salt being employed in excess when $Z_1$ or $Z_2$ is chlorine, bromine or iodine.

2. The process of claim 1 wherein $Z_1$ and $Z_2$ are independently chlorine, fluorine, or a fluoroperhaloalkyl radical having the formula $CF_2X(CFX)_m—$ wherein X is fluorine or chlorine, and $m$ is 0 to 3.

3. The process of claim 2 wherein the ionizable fluoride salt is selected from the group consisting of potassium fluoride, rubidium fluoride, cesium fluoride, silver fluoride and tetra(lower alkyl) ammonium fluoride.

4. The process of claim 3 wherein X is fluorine.

5. The process of claim 4 wherein the cyanogen halide is cyanogen chloride or cyanogen bromide.

6. The process of claim 3 wherein $Z_1$ and $Z_2$ are independently fluorine, chlorine, trifluoromethyl, chlorodifluoromethyl, or pentafluoroethyl.

7. The process of claim 6 wherein the cyanogen halide is cyanogen chloride or cyanogen bromide.

8. The process of claim 7 wherein the ionizable fluoride salt is selected from the group consisting of potassium fluoride, cesium fluoride, and rubidium fluoride.

9. The process of claim 1 wherein the reaction is carried out by adding the carbonyl compound to a mixture of the other reactants in the aprotic, polar, liquid reaction medium.

10. The process of claim 9 wherein the carbonyl compound is added to the reaction mixture at a rate which is about the same as the rate at which the fluoroperhaloalkyl isocyanate is formed.

11. The process of claim 10 wherein the fluoroperhaloalkyl isocyanate is removed from the reaction mixture during the course of the reaction.

12. The process of claim 11 wherein the reaction is carried out at a temperature between about −20° C. and about 100° C.

13. The process of claim 12 wherein $Z_1$ and $Z_2$ are independently fluorine, chlorine, or a fluoroperhaloalkyl radical having the formula $CF_2X(CFX)_m—$ wherein X is fluorine or chlorine, and $m$ is 0 to 3.

14. The process of claim 13 wherein the ionizable fluoride salt is selected from the group consisting of potassium fluoride, rubidium fluoride, cesium fluoride, silver fluoride and tetra(lower alkyl) ammonium fluoride.

15. The process of claim 14 wherein X is fluorine.

16. The process of claim 15 wherein the cyanogen halide is cyanogen chloride or cyanogen bromide.

17. The process of claim 14 wherein $Z_1$ and $Z_2$ are independently fluorine, chlorine, trifluoromethyl, chlorodifluoromethyl or pentafluoroethyl.

18. The process of claim 17 wherein the cyanogen halide is cyanogen chloride or cyanogen bromide.

19. The process of claim 18 wherein the ionizable fluoride salt is selected from the group consisting of potassium fluoride, cesium fluoride and rubidium fluoride.

20. A process for preparing fluoroperhaloalkyl diisocyanates having the formula

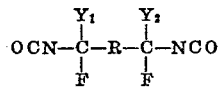

wherein $Y_1$ and $Y_2$ are independently selected from the group consisting of fluorine, chlorine, and fluoroperhaloalkyl radicals having either the formula $CF_2X(CFX)_m—$ wherein X is fluorine, chlorine or bromine and $m$ is 0 to 6, or the formula

wherein X is fluorine, chlorine or bromine and $n$ is 3 to 5, and R is a covalent bond or a perfluoroalkyl diradical of 4 to 6 carbon atoms, which process comprises reacting, under substantially anhydrous conditions at a temperature below 200° C., a dicarbonyl compound having the formula

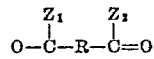

wherein $Z_1$ and $Z_2$ are respectively $Y_1$ and $Y_2$ as defined above or chlorine, bromine or iodine, and R has the meaning given above, with a cyanogen halide an ionizable fluoride salt capable of forming a dialcoholate salt with the dicarbonyl compound, in the presence of an aprotic, polar, liquid reaction medium, the fluoride salt being employed in excess when $Z_1$ or $Z_2$ is chlorine, bromine or iodine.

21. The process of claim 20 wherein R is a perfluoroalkyl diradical of 1 to 6 carbon atoms and $Y_1$ and $Y_2$ are independently selected from the group consisting of fluorine and fluoroperhaloalkyl radicals having the formula $CF_2X(CFX)_m—$ wherein X is fluorine or chlorine and $m$ is 0 to 3.

22. The process of claim 21 wherein the ionizable fluoride salt is selected from the group consisting of potassium fluoride, cesium fluoride, and rubidium fluoride.

23. The process of claim 22 wherein X is fluorine.

24. The process of claim 23 wherein the cyanogen halide is cyanogen chloride or cyanogen bromide.

References Cited
UNITED STATES PATENTS 3,118,923  1/1964  Fawcett et al. _____ 260—453

LEWIS GOTTS, Primary Examiner

D. H. TORRENCE, Assistant Examiner

U.S. Cl. X.R.

260—453 A, 453 AL, 544 F, 544 Y, 566 D, 593 H, 633

PO-1050
(5/69)

UNITED STATES PATENT OFFICE
CERTIFICATE OF CORRECTION

Patent No. 3,705,917　　　　　　　　Dated December 12, 1972

Inventor(s) Cyril Woolf et al

It is certified that error appears in the above-identified patent and that said Letters Patent are hereby corrected as shown below:

Column 1, Line 19 "$(CF_3)_2CFNO$" should be -- $(CF_3)_2CFNCO$ --

Column 6, Line 66 "intially" should be -- initially --

Column 7, Line 26 " $-CH(CFX)_n$ " should be -- $-CF(CFX)_n$ --

Signed and sealed this 12th day of June 1973.

(SEAL)
Attest:

EDWARD M. FLETCHER, JR.　　　　　　ROBERT GOTTSCHALK
Attesting Officer　　　　　　　　　　Commissioner of Patents